United States Patent
Aoki et al.

(10) Patent No.: US 6,453,390 B1
(45) Date of Patent: Sep. 17, 2002

(54) PROCESSOR CYCLE TIME INDEPENDENT PIPELINE CACHE AND METHOD FOR PIPELINING DATA FROM A CACHE

(75) Inventors: Naoaki Aoki; Sang Hoo Dhong; Nobuo Kojima, all of Austin, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,405

(22) Filed: Dec. 10, 1999

(51) Int. Cl.[7] ............................................. G06F 12/00
(52) U.S. Cl. ...................................... 711/140; 711/169
(58) Field of Search ................................. 711/140, 169; 712/205, 206, 207, 208; 713/400, 401, 500

(56) References Cited

U.S. PATENT DOCUMENTS

| | | | | |
|---|---|---|---|---|
| 5,544,342 A | * | 8/1996 | Dean ........................... | 395/446 |
| 5,553,276 A | * | 9/1996 | Dean ........................... | 395/550 |
| 5,557,768 A | * | 9/1996 | Braceras et al. ............. | 395/458 |
| 5,689,689 A | * | 11/1997 | Meyers et al. ............... | 709/400 |
| 5,710,910 A | * | 1/1998 | Kehl et al. ................... | 713/400 |
| 6,185,660 B1 | * | 2/2001 | Mulla et al. ................. | 711/140 |
| 6,202,139 B1 | * | 3/2001 | Witt et al. .................... | 711/169 |
| 6,226,713 B1 | * | 5/2001 | Mehrotra ..................... | 711/118 |

OTHER PUBLICATIONS

"A 1.0 Ghz Single –Issue 64–Bit PowerPC Integer Processor", Joel Silberman, et al., IEEE Journal of Solid–State Circuits, vol. 33, No. 11. Nov. 1998, IEEE, pp. 1600–1608.
"Designing For A Gigahertz", H. Peter Hofstee, et al., IEEE Micro, May–Jun. 1998, pp. 66–74.
"Design Methodology for a 1.0 Ghz Microprocessor", S. Posluszny, et al., IEEE 1998, pp. 17–23.
Seizovic, "Pipeline Synchronization," IEEE, pp. 87–96, 1994.*
Yoo et al., "High Speed Counterflow–Clocked Pipelining Illustrated on the Design ofHDTV Subband Vector Quantizer Chips," IEEE, pp. 91–106, 1995.*
Ramamoorthy et al., "Pipeline Architecture," ACM, pp. 61–102, 1977.*

* cited by examiner

Primary Examiner—Matthew Kim
Assistant Examiner—Stephen Elmore
(74) Attorney, Agent, or Firm—Casimer K. Salys; Bracewell & Patterson, L.L.P.

(57) ABSTRACT

A processor cycle time independent pipeline cache and method for pipelining data from a cache provide a processor with operand data and instructions without introducing additional latency for synchronization when processor frequency is lowered or when a reload port provides a value a cycle earlier than a read access from the cache storage. The cache incorporates a persistent data bus that synchronizes the stored data access with the pipeline and can also utilize bypass mode data available from a cache input from the lower level when data is being written to the cache.

20 Claims, 5 Drawing Sheets

Local Clock Generator
for the Pulse Stretched Circuit

PROCESSOR CYCLE TIME INDEPENDENT PIPELINE CACHE AND METHOD FOR PIPELINING DATA FROM A CACHE

BACKGROUND OF THE INVENTION

1. Field of the Invention

The present invention generally relates to cache memory used in computer systems, and more particularly to a pipeline cache for loading instructions and data in a computer system that is processor cycle time independent.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure the integrity of data that may be operated on by multiple processes on multiple processors and potentially contained in multiple cache units. It is desirable to satisfy these objectives consistent with the further commercial objectives of increasing processing throughput, minimizing electronic device area and reducing complexity.

Both multiprocessor and uniprocessor systems usually use multi-level cache memories where typically each higher level is smaller and has a shorter access time. The cache accessed by the processor, and typically contained within the processor component of present systems, is typically the smallest cache. As such, the cache entries available at the highest level cache are often being reallocated. This is due to requests for new data and a need for space to store that data within the higher levels of cache memory. As new reads are performed up the levels of cache, the data being brought up from a lower level is typically written to the cache through a secondary port connected to the bus to which the lower level of the memory hierarchy is coupled. The data from this port can be made available to the higher level port (to which the next higher level of the memory hierarchy or in the case of the highest level of the memory hierarchy, the processor is coupled) in a "bypass" or "lookaside" mode, so that the data being written to the particular level is available without an additional read cycle.

Pipeline instruction and operand data caching systems have been used to improve the performance of data processing systems for many years. The object of a pipeline system is to perform loading of instructions or data, core execution, and other functions performed by a core simultaneously, rather than having load operations delay the operation of the core. Also, multiple instruction or data loads can be queued by load store units or instruction sequencers. Therefore, it is desirable to reduce any delays associated with retrieving these values from cache or other memory.

When reading data from a cache level, the latency (which is the time required for the data to be available from the read operation) is not constant. Processor frequency and type of operation may affect when the data is available. For example, when a relatively slow processor clock frequency is used, data may be available from a cache in one instruction cycle, whereas at a higher processor clock frequency data from a cache may not be available for two processor cycles. In addition, when a particular value is not present in the cache, a cache "miss" occurs and the value must be read from a lower level in the memory hierarchy into the higher level. By taking advantage of the fact that data is present while being written into the higher level of the memory hierarchy, the bypass mode can be implemented such that the data is read immediately at the end of the fetch from lower level cache. Present systems accomplish this by multiplexing data from the lower level port and the storage array in the cache. These multiplexers require circuit area and the signal lines to the multiplexers complicate circuit interconnect layers and occupy interconnect space.

Present pipeline systems synchronize the instruction and data pipeline, (which are operated synchronously with the processor) with the cache by latching values to keep the cache read latency synchronized with the pipeline, no matter what the processor clock frequency is. In addition, systems that read data from the cache or select data in bypass mode that is concurrently being written to the cache use a multiplexing scheme that selects either the write input to the cache (bypass) or the latched read data from the cache. These multiplexers add delay to the overall circuit path, and in addition, many present systems perform a "read after write" operation where the data is written to the cache from the lower level before the processor is allowed to read the cache entry, so that any advantage presented by the bypass mode data being available early is lost due to the need to synchronize that data with the pipeline.

Therefore, it would be desirable to implement a pipeline cache such that data does not have to be latched as cycle time is lengthened, for example when processor clock frequency is lowered. In addition, it would be desirable to implement a pipeline cache wherein the early availability of bypass mode data can be used advantageously. Further, it would be desirable to eliminate multiplexer delays when implementing a system that can select between the bypass port and the cache storage array.

SUMMARY OF THE INVENTION

It is therefore one object of the present invention to provide an improved pipeline cache wherein data does not have to be latched when pipeline clock frequency is decreased.

It is a further object of the invention to provide an improved pipeline cache wherein data in bypass mode and data provided from the storage array are not selected via a multiplexer from independent buses.

It is still another object of the invention to provide an improved pipeline cache wherein bypass mode data can be used as soon as it is available.

The foregoing objects are achieved in a dynamic data pipeline having a bus input for providing a data value, clock means for indicating when the data value is valid, preset means for presetting a summing node when the clock means indicates that the data is invalid and a data input means coupled to the bus input for setting the summing node to a value in conformance with the data value. The data input means may further couple a plurality of data inputs by a plurality of devices connected to the summing node, and at least one of the devices may be coupled to a reload port. The preset means may be provided by a PMOS transistor with channel connections coupled to a supply rail, and the summing node and a gate connection coupled to an output of the clock means. The data input means may be provided by an NMOS transistor having a gate coupled to the bus input and a channel connection coupled to the summing node. The above objects are also accomplished in a method for pipelining data and a cache memory incorporating the dynamic data pipeline described above.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like numbers correspond to like elements and further:

DESCRIPTION OF THE ILLUSTRATIVE EMBODIMENTS

Figure 1:
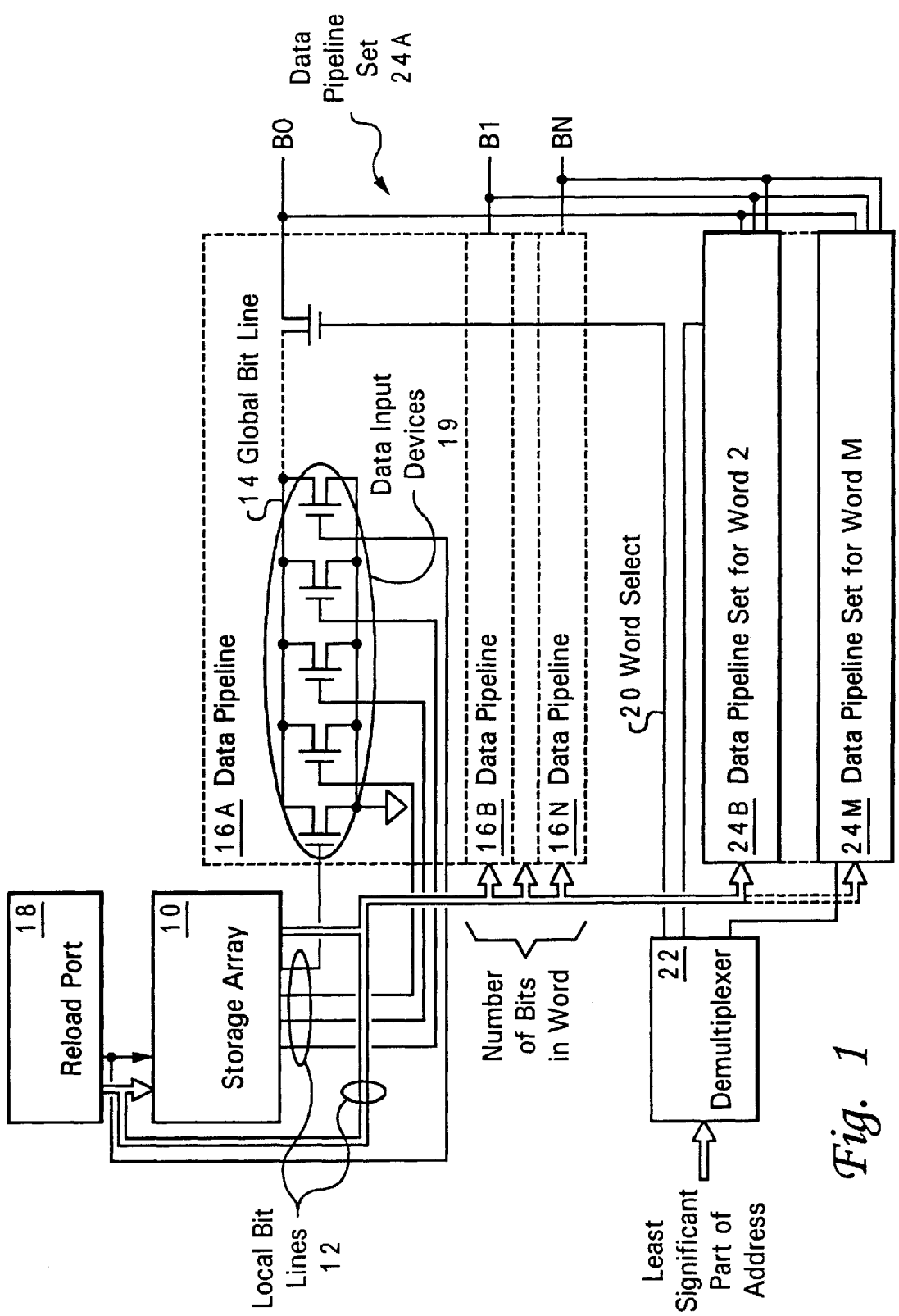
FIG. 1 is a high-level electrical schematic diagram of a memory subsystem in accordance with one embodiment of the present invention.

With reference now to the figures, and in particular with reference to FIG. 1, there is depicted a cache memory subsystem in accordance with one embodiment of the present invention.

Storage array 10 is a collection of memory cells as is generally found in cache memories for the storage of cache line entries. Reload port 18 is a port that supplies write data to the cache storage array from a lower level in the memory hierarchy and will supply read-through data while the write data is being written to storage array 10. The data lines from storage array 10 are coupled to a plurality of data pipelines 16A–16N via local bit lines 12. Each of the plurality of data pipelines 16A–16N has a corresponding common bit line, generally designated BO-BN. The local bit lines and lines from reload port 18 each feed data input devices 19 in the plurality of data pipelines 16A–16N and global bit line 14 is created from the logical OR configuration produced by the parallel connection of data input devices 19.

Local bit lines 12 represent data from individual sets within storage array 10. These sets contain data from individual address locations in memory and are selected from a match condition for a particular line as is well known in the art. A local bit line 12 will contain data selected from the particular cache line selected from the match condition. All other local bit lines 12 will be in a low logic state for this embodiment, as the OR logic created by data input devices 19 requires that the inactive local bit lines 12 will not activate a data input device 19 other than the device connected to the local bit line 12 that is active. Other configurations are possible, such as using PMOS devices for data input devices 19, which would require an inactive high logic state.

A data pipeline is supplied for each bit in the data path from storage array 10. The data pipeline performs a logical OR operation using the individual local bit lines 12 and the reload port 18 line for that bit value into global bit line 14, then the data pipeline stretches, i.e., maintains the persistence of, the data value to provide the operation of the invention as described below. Word Select line 20 selects the outputs of a group of data pipelines 16 from a set of data pipelines 16 and 24 supplied for each word within the cache line. Demultiplexer 22 takes the lowest part of the address to select the individual word within the cache line.

Figure 2:
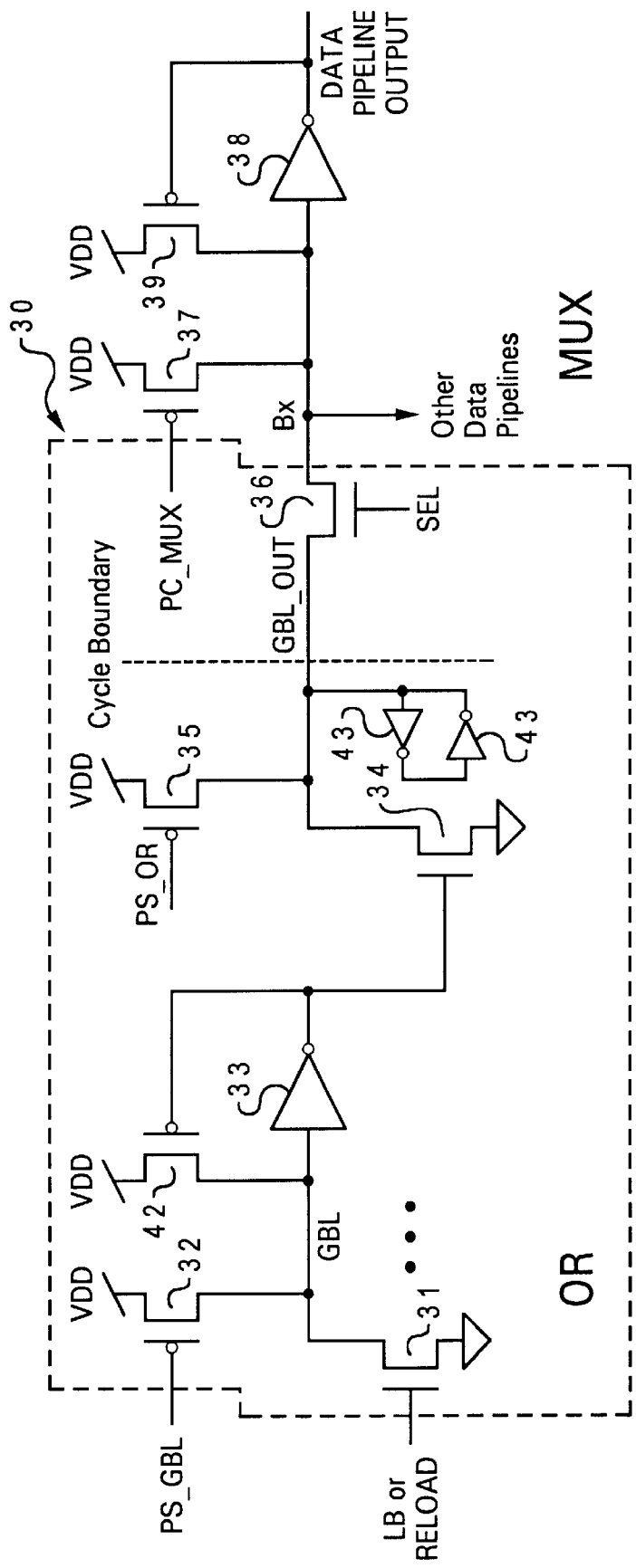
FIG. 2 is an electrical schematic diagram of a data pipeline circuit in the improved pipeline cache.

Referring now to FIG. 2, an embodiment of a data pipeline 30 that can implement data pipelines 16A–16N and 24A–24N of FIG. 1, is shown in electrical schematic form. A NOR gate is formed by input devices 31 which are NMOS transistors as depicted in this embodiment. Local bit lines LB or RELOAD data are connected to a respective data input device 31. PMOS transistor 32 presets the voltage at summing node GBL which forms the global bit line (analogous to global bit line 14 shown in FIG. 1) for this data pipeline 30. Inverter 33 inverts the signal on GBL producing an OR output from this state, and PMOS transistor 42 acts as a clamp if the summing node GBL is in a logic high state after PMOS transistor 32 ceases to conduct.

NMOS transistor 34 provides a second voltage inversion taking the OR input from inverter 33 and producing GBL__OUT signal, which is a non-inverted version of GBL that has been stretched by the operation of preset signals PS__GBL and PS__OR representing a logical NOR of the input signals. Inverters 43 connected back-to-back, provide a full latch to maintain the state of the second node GBL__OUT, in the state to which it is set by PMOS transistor 35 and/or NMOS transistor 34. Multiplexer switch, NMOS transistor 36 selects the GBL__OUT signal onto a common bit line Bx that is coupled to other data pipelines 30 that are processing local bit line and reload signals from other words from storage array 10.

PC__MUX is a preset signal controlling PMOS transistor 37 to preset the common bit line Bx, before it is used to feed a final inverter state 38 connected to another half-latch PMOS transistor 39. PMOS transistor 39 maintains a high state on common bit line Bx if Bx has not been pulled to a logical low by any of data pipelines 30 selected by word select 20 connected to Bx. The OUT signal provides a non-inverted version of the logical OR of the local bit lines LB and the RELOAD line from reload port 18, that has been stretched by the action of the data pipeline.

Figure 3:
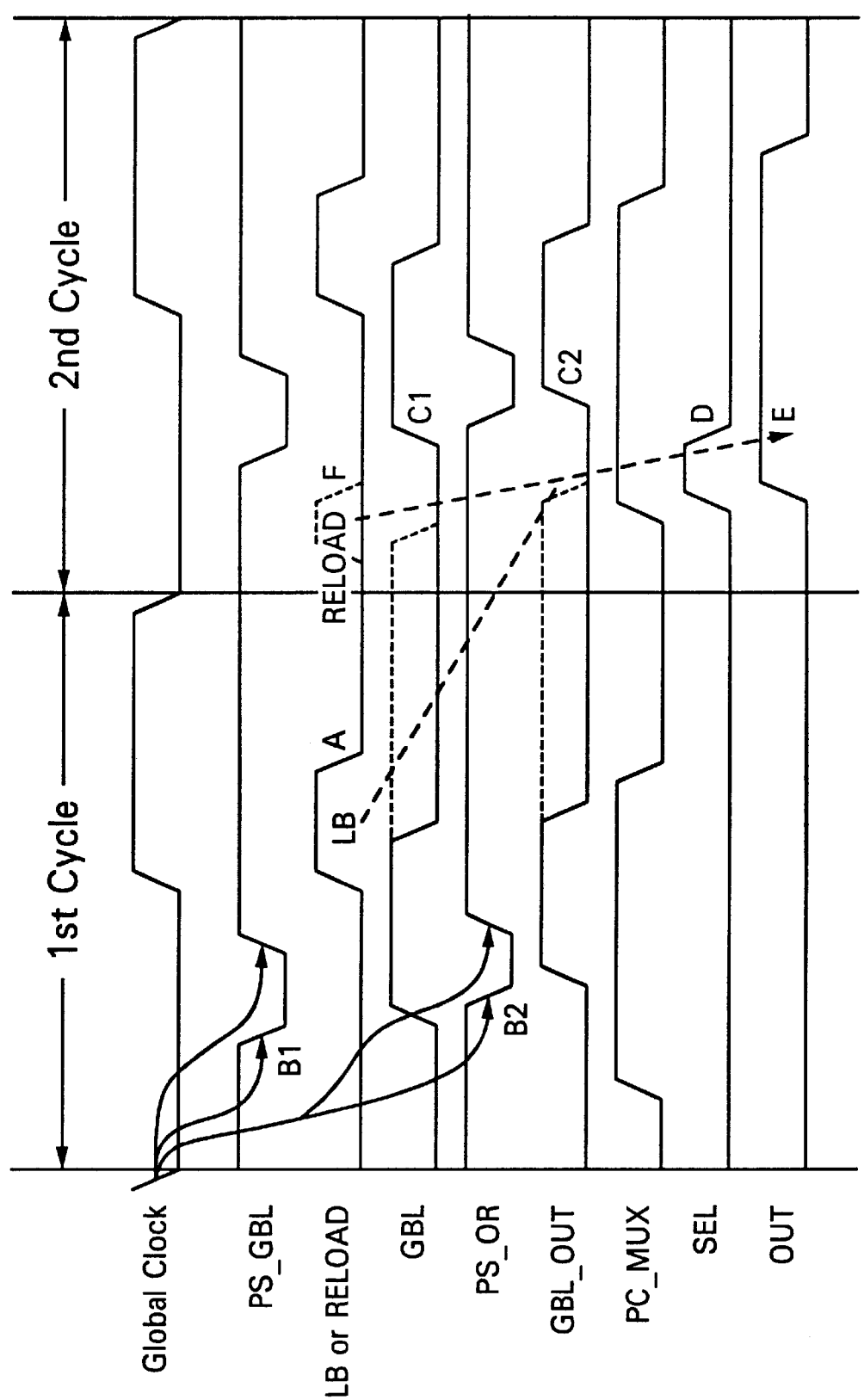
FIG. 3 is an logic timing diagram showing the relationship between signals in a data line circuit in the improved pipeline cache.

Referring additionally to FIG. 3, the detailed operation of the data persistent operation of the data pipeline is shown in a logic timing diagram. In the first cycle ($1^{st}$ Cycle) delineated by global clock falling to the logic low condition at time, the data is not valid from the LB signals or the RELOAD signals. PS__GBL is a preset signal generated from the falling edge of global clock, but delayed until time B1, and is used to preset the first summing node GBL by controlling PMOS transistor 32. After PS_GBL returns to a high logic state, the state of the global bit line GBL is controlled by input devices 31. The variable state is depicted by the dashed line in the GBL signal indicator. The GBL signal remains in the state set by the LB or RELOAD signals even after they return to an invalid state at time A. The PS_OR signal is a preset signal likewise generated from the falling edge of global clock, but delayed until time B2, and is used to preset the second node GBL_OUT by controlling PMOS transistor 35. After PS_OR returns to a logic high state, the state of the GBL_OUT line is controlled by the state of the input to NMOS transistor 34, which is the inverted version of GBL. By delaying the occurrence of the falling edge of PS_OR, the data value on the GBL_OUT line can be, persistent to the point where it is needed in the processor cycle at time C2.

The action of PC_MUX presets the common bit line Bx to the logic high state before the data is selected by the SEL signal, which activates multiplexer NMOS transistor 36. The data is inverted by inverter 38 which creates the OUT signal as depicted. The logic value at GBL_OUT remains a valid image of the original input LB signal logically OR'ed with the RELOAD signal, until is PS_OR drops to a logic low state again, presetting the GBL_OUT for the next access cycle at time C2. The OUT signal is maintained even after the SEL signal removes the GBL_OUT connection at time D from the common bit line Bx, by the action of half-latch 39. The dashed arrows in the diagram, showing a data flow from LB at time A and RELOAD at time F, show the ability of the circuit to synchronize the pipeline output to data loaded from storage array 10 or with data provided by reload port 18. As depicted, RELOAD data is ready just before the beginning of the second cycle in the sequence and data pipeline 30 can respond because the state of GBL and GBL_OUT at that point is still controlled by data input devices 31, as the preset signals have completed their actions. This is not the same operation as provided by conventional latches, as the latches are synchronized to the rising edge of global clock when the data on the local bit lines LB is valid. The effect of using a latch would be to carry the LB signal forward and the usual implementation with respect to the RELOAD signal is to use a multiplexer to select one or the other. The disadvantage of the prior techniques is that the RELOAD data is further delayed by the multiplexer action and could not produce an OUT signal with as little delay as that of the present invention.

Figure 4:
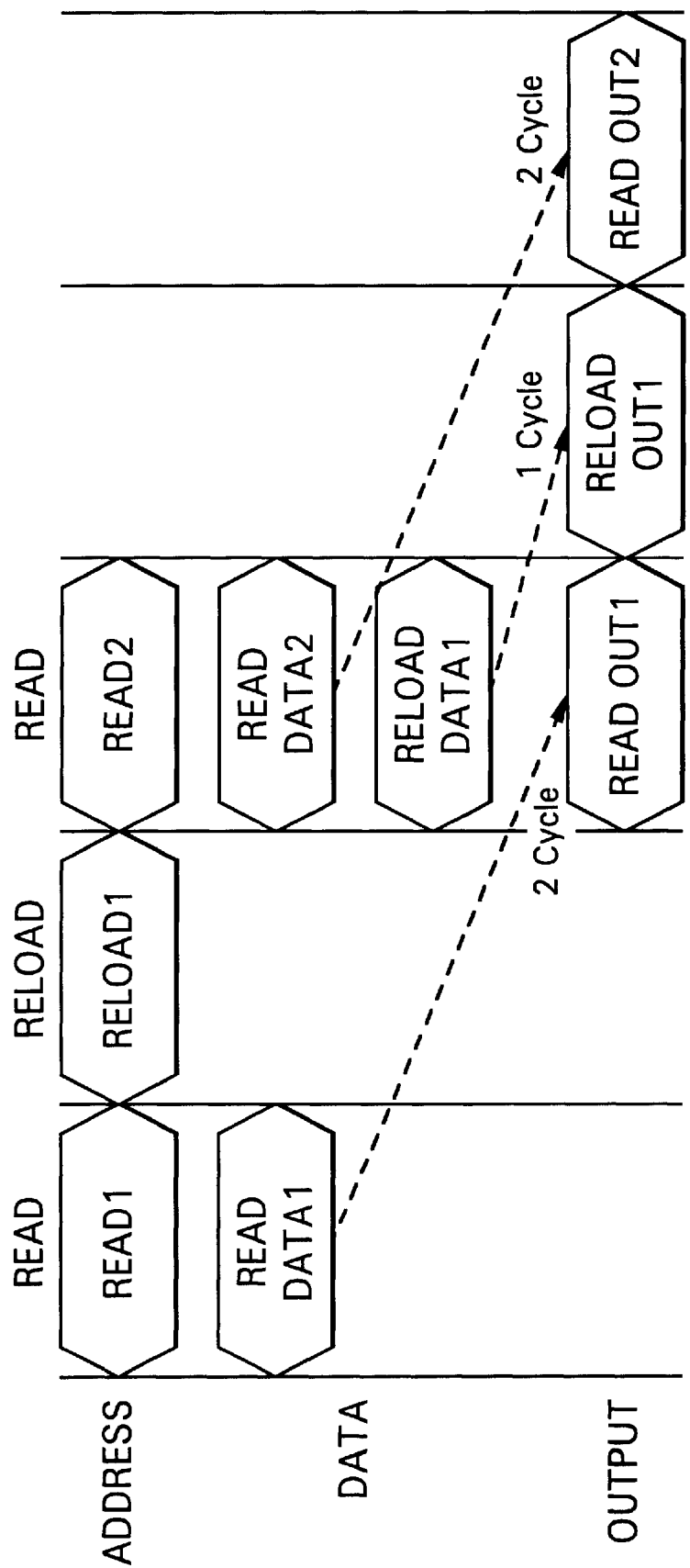
FIG. 4 is a data timing diagram showing the relationship between data reads in the improved pipeline cache.

Referring now to FIG. 4, the operation of data pipeline 30 is shown with respect to data flow in the processor instruction and data load pipelines. Read data has a latency of two clock cycles (delineated by the vertical lines in the diagram). Reload data has a latency of one cycle. The data pipeline has avoided a two cycle delay of a conventional pipeline by allowing the reload data (RELOAD OUT1) to be presented immediately after the first read data cycle data is presented (READ OUT1), and the processor cycle after the first read cycle data is presented is not stalled waiting for the reload data.

Figure 5:
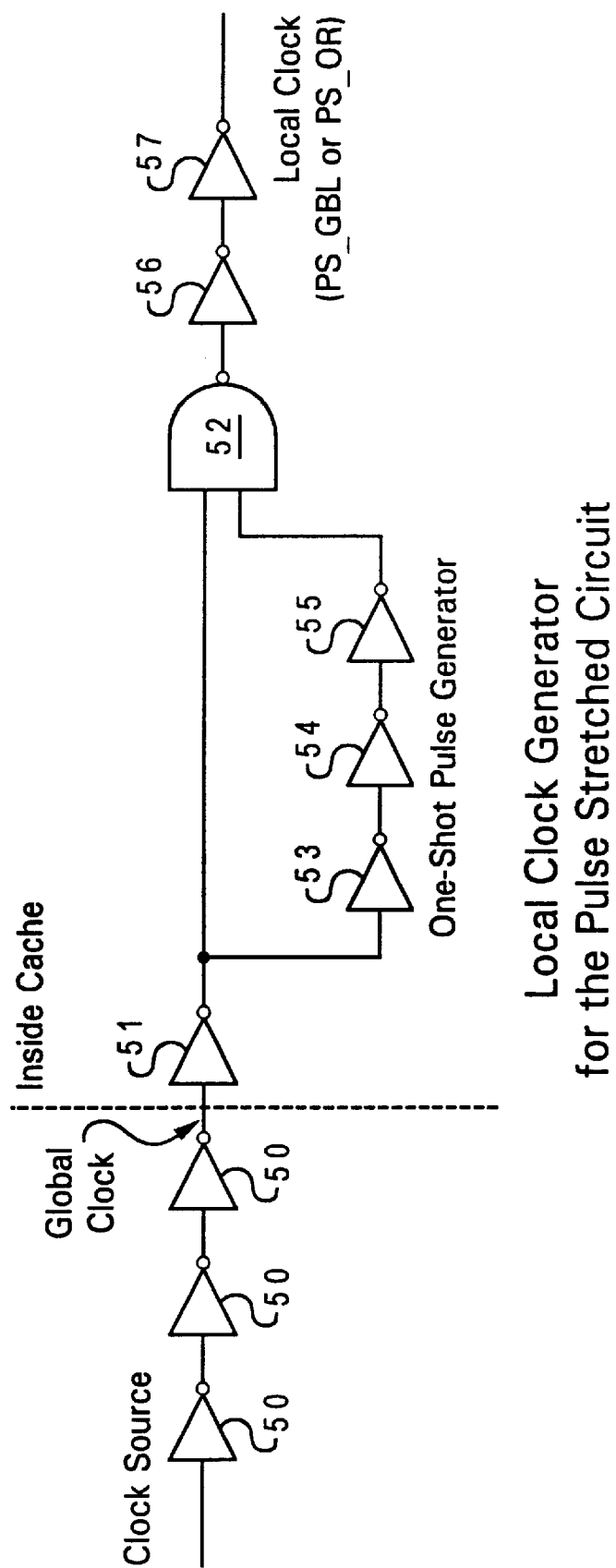
FIG. 5 is an electrical schematic diagram of a clock generator circuit providing clock signals for use by the data pipeline.

Referring now to FIG. 5, a clock generator circuit for generating the preset signals PS_OR and PS_GBL is depicted in electrical schematic form. A clock source, which may be a crystal oscillator output, phase-lock loop output, or other system timing device is buffered through inverters 50 to produce global clock. Within the cache, inverter 51 inverts global clock and presents it to NAND gate 52, where it is compared with a non-inverted copy of global clock created by a one-shot pulse generator formed by inverters 53, 54, and 55. When global clock falls to a logic low level, the delay through inverter 51 delays the rising edge of the output connected to NAND 52, which provides the delay of the PS_GBL or PS_OR, depending on which is being generated by this circuit. This causes NAND to activate a logic low output, since the other input is an inverted version of the prior state of the inverted global clock signal. After the rising edge of this signal propagates through the one-shot pulse generator, becoming a falling edge at the NAND 52 input, NAND 52 will deactivate, ending the local clock active low signal. Two of these circuits are needed to drive the data pipeline preset signals, one for PS_GBL and one for PS_OR, although in certain cases, these signals might be provided as the same signal, or portions of circuits might be used in common. For example, the PS_OR, signal might be a copy of local clock, further delayed by a pair of inverters.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, the techniques of the present invention could be adapted to non-cache memory arrays or other devices where data must be sychronized with other devices. It is therefore contemplated that such modifications can be made without departing from the spirit or scope of the present invention as defined in the appended claims.

What is claimed is:

1. A dynamic data pipeline comprising:
   at least one bus input, for providing a data value;
   clock means for indicating when said data value is valid;
   first preset means for presetting a first summing node responsive to said clock means indicating said data value is invalid, said first preset means ceasing to preset said first summing node before said clock means indicates said data value is valid;
   at least one data input means coupled to said at least one bus input for setting said first summing node in conformity with said data value; and
   persistence means for synchronizing an access of said data value with said dynamic data pipeline without introducing latency.

2. The data pipeline of claim 1 wherein said at least one data input means comprises a plurality of data input devices coupled to said first summing node for setting said first summing node and at least one of said data input devices is coupled to a first one of said bus inputs that comprise global data lines supplied by a cache storage array.

3. The data pipeline of claim 2, wherein at least one other of said data input devices is coupled to a second one of said bus inputs that further comprises a reload data line supplied by a reload port.

4. The data pipeline of claim 1, wherein said clock means comprises:
   a NAND gate having a first input coupled to an inverted clock; and
   inverting delay means with an input coupled to a non-inverted clock and an output coupled to a second input of said NAND gate, for delaying and inverting said direct input, so that an output of said NAND gate generates a pulse of duration determined by said delay means when said inverted clock transitions from a logic low state to a logic high state.

5. The data pipeline of claim 1, wherein:
   said first preset means comprises a PMOS transistor having a first channel terminal coupled to a positive supply rail and a second channel terminal further coupled to said first summing node, and a gate coupled to an output of said clock means, and said at least one data input means comprises at least one NMOS transistor, having a gate coupled to said at least one bus input and a channel connection coupled to said first summing node.

6. The data pipeline of claim 5, wherein said clock means comprises:

a NAND gate having a first input coupled to an inverted clock; and inverting delay means with an input coupled to a non-inverted clock and an output coupled to a second input of said NAND gate, for delaying and inverting said direct input, so that an output of said NAND gate generates a pulse of duration determined by said delay means when said inverted clock transitions from a logic low state to a logic high state.

7. The data pipeline of claim 1, further comprising second preset means for presetting a second node responsive to said clock means indicating a data invalid state.

8. The data pipeline of claim 7, wherein said persistence means includes an input coupled to said first summing node and an output coupled to said second node for inverting and maintaining persistence of said data value.

9. The data pipeline of claim 8, further comprising selector means for selecting an output of said inverter means onto a common connection shared with at least one other data pipeline.

10. A cache memory comprising:

a storage array for storing values;

a multiple cycle data access pipeline;

preset means for generating a first preset strobe from one edge of a system clock signal provided to said cache memory; and means for synchronizing said multiple cycle data access pipeline without introducing latency including means for maintaining persistence of at least one data output value of said storage array until the assertion of a second preset strobe so that data arriving prior to said assertion of said second preset strobe can be provided to an output of said cache memory.

11. The cache memory of claim 10, further comprising a reload-port for providing write data to said storage array, and said means for maintaining persistence receives at least one output of said reload port and presents it to said output of said cache memory.

12. The cache memory of claim 10, wherein said means for maintaining persistence comprises at least one data input means coupled to at least one bus input provided from said storage array for setting a first summing node in conformity with an output of said storage array.

13. The cache memory of claim 12, wherein said at least one data input means comprises a plurality of data input devices coupled to said first summing node for setting said first summing node and at least one of said data input devices is coupled to a first one of said at least one bus inputs that comprises a global data line supplied by said storage array.

14. The cache memory of claim 12, wherein:

said preset means comprises a PMOS transistor having a first channel terminal coupled to a positive supply rail and a second channel terminal further coupled to said first summing node, and a gate coupled to said first preset strobe, and said at least one data input means comprises at least one NMOS transistor, having a gate coupled to said at least one bus input and a channel connection coupled to said first summing node.

15. The cache memory of claim 14, further comprising second preset means for presetting a second node responsive to said second preset strobe indicating a data invalid state.

16. The cache memory of claim 15, further comprising inverter means having an input coupled to said first summing node and an output coupled to said second node for inverting and maintaining persistence of said at least one data output value.

17. The cache memory of claim 16, further comprising selector means for selecting said output of said inverter means onto a common connection shared with at least-one other data pipeline.

18. The cache memory of claim 10, further comprising clock means coupled to said preset means comprising:

a NAND gate having a first input coupled to an inverted clock; and inverting delay means with an input coupled to a non-inverted clock and an output coupled to a second input of said NAND gate, for delaying and inverting said input, so that an output of said NAND gate generates a pulse of duration determined by said delay means when said inverted clock transitions from a logic low state to a logic high state.

19. A method for synchronizing a multiple cycle data access from a cache, comprising the steps of:

generating a first pulse from an edge of a clock indicating the beginning of a data access cycle;

presetting at least one node responsive to said first pulse;

resetting said at least one node responsive to at least one data input value; and maintaining persistence of said at least one data input value until said generating step generates a second pulse without introducing latency.

20. The method of claim 19, wherein said at least one data input value includes a reload input from a reload port and said resetting step resets said at least one node responsive to said reload input.

* * * * *